United States Patent [19]

Clay et al.

[11] E Re. 28,848

[45] Reissued June 8, 1976

[54] BLASTING SLURRY COMPOSITIONS CONTAINING CALCIUM NITRATE AND METHOD OF PREPARATION

[75] Inventors: Robert B. Clay, Bountiful; Melvin A. Cook; Lex L. Udy, both of Salt Lake City, all of Utah

[73] Assignee: Ireco Chemicals, Salt Lake City, Utah

[22] Filed: Oct. 24, 1972

[21] Appl. No.: 300,323

Related U.S. Patent Documents

Reissue of:

[64] Patent No.: 3,660,181
Issued: May 2, 1972
Appl. No.: 821,095
Filed: May 1, 1969

[52] U.S. Cl. ..... 149/2; 149/21; 149/41; 149/44; 149/60; 149/61; 149/75; 149/76

[51] Int. Cl.[2] ..... C01B 1/04; C06B 19/00

[58] Field of Search ..... 149/41, 44, 60, 61, 149/75, 76, 2, 21

[56] References Cited

UNITED STATES PATENTS

| | | | |
|---|---|---|---|
| 3,397,097 | 8/1968 | Atadan et al. | 149/61 X |
| 3,450,582 | 6/1969 | Sheeran | 149/60 X |
| 3,465,675 | 9/1969 | Bronstein, Jr. | 149/44 X |
| 3,522,117 | 7/1970 | Atadan et al. | 149/61 X |

*Primary Examiner*—Leland A. Sebastian
*Attorney, Agent, or Firm*—Merriam, Marshall, Shapiro & Klose

[57] ABSTRACT

Slurry blasting compositions of low water content and high density, including substantial proportions of calcium nitrate as an oxidizer component, can be sensitized in various ways to produce economical explosive compositions. Sensitizers may include aluminum powder, granular explosives such as smokeless powder, TNT, etc.; a particularly preferred sensitizer or fuel is ethylene glycol. Solid carbonaceous fuels and conventional thickeners may be added. The calcium nitrate may be produced directly from burned lime with nitric acid and/or other nitrates.

10 Claims, No Drawings

BLASTING SLURRY COMPOSITIONS CONTAINING CALCIUM NITRATE AND METHOD OF PREPARATION

Matter enclosed in heavy brackets [ ] appears in the original patent but forms no part of this reissue specification; matter printed in italics indicates the additions made by reissue.

BACKGROUND AND PRIOR ART

In recent years, explosive blasting slurries, containing aqueous solutions of ammonium nitrate and other powerful inorganic oxidizers plus thickeners, fuels and sensitizers, have come into extensive use, particularly in the hard rock mining and construction industries. These slurry compositions are commonly made up of an aqueous solution of ammonium nitrate, to which sodium nitrate may be added. The solution is thickened with guar gum and/or starch to a viscous heavy liquid or gel, and sensitized usually with high energy fuels such as powdered aluminum and/or self-explosives such as TNT. In some cases the liquid component has included non-aqueous but water-compatible liquids, such as alcohols, glycols, amides such as formamide, and analogous nitrogen-containing liquids having fuel value as well as having the solvation or extender properties of liquids. Typical of such slurries are those described in U.S. Pat. No. 2,930,685 and U.S. Reissue Pat. No. 25,695 to Cook and Farnam, also in U.S. Pat. Nos. 3,249,474, 3,249,476, and 3,249,477, 3,382,117, and others. Some of these have suggested possible use of calcium nitrate as an ingredient of such slurries. As far as the present inventors are aware, however, no substantial or practical use has been made of this ingredient.

One reason that calcium nitrate has not been used to any substantial extent is the fact that it is quite insensitive. As a matter of fact, aqueous slurries containing most of the usual inorganic oxidizers are quite difficult to detonate. Considerable effort has been expended in developing slurries which are "sensitive" enough for practical use as industrial explosives. Thus, the use for this purpose of small quantities of very finely divided heat-producing metal, such as aluminum, or of aluminum assisted by other ingredients, is well known. Also, the use of self-explosive particles distributed throughout the slurry, such as granules of TNT, grains of smokeless powder, and the like, and combinations of such with aluminum, etc., are known. Furthermore, the sensitivity-contributing effect of tiny gas bubbles, especially of entrapped air bubbles, has been recognized and suggested as being desirable, as mentioned in some of the patents referred to above. Even with these effective sensitizers, however, calcium nitrate as a substantial and significant ingredient of blasting slurry compositions has not been used in practice and its use, as a rule, has not been considered feasible, as far as the present inventors are aware.

The presence of water in such slurries, of course, detracts greatly from their sensitivity. However, in order to maintain the desired liquidity or fluidity for mixing, pumping and/or pouring the slurries into boreholes for immediate use, or into packages for storage, substantial proportions of some kind of liquid usually are required. Thus, commercially usable slurries ordinarily contain as much as 12 to 20% by weight, or more, of water. Somewhat lower proportions can be used if fluidity for pumping is not needed. Where the particulate materials are present in a variety of particle sizes, aluminum particles for instance, less liquid is required for a given viscosity. See U.S. Reissue Pat. No. 25,695. Generally speaking, any combination of calcium nitrate as an oxidizer, with its known insensitivity, and of relatively high water content in a blasting slurry would be expected to be so dead or insensitive as to be impractical. Moreover, calcium nitrate usually contains considerable water of crystallization and this would appear to be a deterrent to its use. The content of such water of crystallization in calcium nitrate varies somewhat from place to place, depending on storage conditions and on the various processes of manufacture. It usually runs about 14%, more or less, by weight in commercial calcium nitrate.

Contrary to the disadvantages suggested above, the present inventors have found that calcium nitrate can be used effectively and in substantial proportions in aqueous blasting slurries, with several advantages that the prior art seems not to have recognized. Among such advantages are the following:

Calcium nitrate slurries can be made having relatively high density or specific gravity, as compared with slurries made up primarily of ammonium nitrate and other conventional ingredients.

b. The slurries of the present invention require considerably less water to render them fluid, due to release of the water of crystallization normally present in calcium nitrate, when made by the process of this invention; the water requirements can be reduced further and advantageously by substitution of ethylene glycol or analogous organic liquid for part or most of the water.

c. The cost of calcium nitrate slurries is relatively low.

d. Calcium nitrate per se can easily be produced in situ and in the field and, using cheap starting materials.

e. Where explosive sensitizers are used, proportions required can be substantially reduced, as compared with general practices in the art.

f. The congelation temperature or "fudge" point of slurries containing calcium nitrate can be lower, other things being equal or, alternatively, larger total salt proportions can be used without raising the fudge point.

Other advantages will appear as this invention is more fully described hereinafter.

A further advantage of the use of calcium nitrate according to the present invention, is the possibility of using products of higher density. Conventional slurries often are sensitized in part by inclusion of fine bubbles of air or other gases provided their densities are not too high. They do not appear to respond very well to sensitization by such gas bubbles when made with densities exceeding about 1.4 grams per cubic centimeter. This limitation appears not to apply in the same degree to the slurries of the present invention.

A significant aspect of the present invention, which was mentioned briefly above, pertains to the "fudge" point or congelation temperature of the composition. In present commercial practice, a solution of the oxidizer salt, which is usually ammonium nitrate or a combination of sodium nitrate and ammonium nitrate, is dissolved in hot water. Thereafter, fuels and/or sensitizrs, etc., in solid particulate form and usually insoluble ı the liquid are added to the solution. As the resulting urry cools, it reaches a point at which the salts in ɔlution begin to precipitate, causing a rapid thickening r solidification. The temperature at which this occurs , the so-called "fudge" point and it varies with the omposition. Obviously, it is desirable to have a fudge oint low enough that necessary mixing and pumping f the slurry can be accomplished before the material :arts to solidify, that is, before the fudge point is eached.

The use of calcium nitrate, contributing liquid as it oes by release of at least some of its water of crystalliation either lowers the fudge point or, alternatively, ıakes it possible to use more total oxidizer in the soluıon without raising the same fudge point. This is an nportant aspect of this invention.

DESCRIPTION OF PREFERRED EMBODIMENT

The invention will be explained further by giving pecific examples of compositions incorporating it.

A series of samples of explosive slurry were made up, imply using calcium nitrate to replace part of the norıal ammonium nitrate and/or sodium nitrate, as folɔws. Parts shown are percentage by weight.

TABLE I

| | A | B | C | D |
|---|---|---|---|---|
| ımmonium nitrate | 42 | 45 | 45 | 55.2* |
| odium nitrate | 9 | 10 | 10 | — |
| :alcium nitrate | 37 | 36.5 | 36.5 | 36.8* |
| Vater | 12 | 8.5 | 8.5 | 8.0* |
| iuar gum thickener | 0.1 | 0.1 | 0.1 | 0.25 |
| :thylene glycol | 0.2 | — | — | 0.5 |
| 'ropylene glycol | — | 1.0 | 1.0 | — |
| 'NT ("Pelletol") | 16 | — | — | — |
| iilsonite | 3.7 | 6.0 | 6.0 | — |
| ıluminum—coarse | — | 9.0 | 9.0 | — |
| ıluminum—fine | — | 1.0 | 1.0 | — |
| mokeless powder | — | — | — | 28 |
| )ensity | — | 1.40 at 54°C. | 1.34 at 54°C. | — |

Composition A was prepared by dissolving the solium nitrate first in warm water, 70° C, then adding the ımmonium nitrate and calcium nitrate together. In hese tests a Norwegian calcium nitrate was used. This :omposition was not tested for detonation but would be :xpected to be detonable and it had a good consisency. In Compositions B and C test charges were made ıp in 2 inches, 2 ½ inches, and 3 inches diameters, in engths six times the diameter. The 2 inches charges ailed to detonate completely but the larger charges vere all fired successfully with a standard booster. For Composition D the proportions starred made up 100% ɔf the solution. For sensitizer, 28 parts of HSSP double ɔase smokeless powder was used. This product had a ɔlution density (before addition of smokeless powder) ɔf 1.61. Density after addition of the SP was not deternined. This product fired in a 2-inch column with a ;tandard "2A" booster.

Another series of tests were made, starting with a ;tandard oxidizer solution $S_1$ which was made up of the 'ollowing ingredients, parts by weight.

| | |
|---|---|
| Ammonium nitrate (AN) | 32.5 or 35.9% |
| Calcium nitrate (CN) | 37.0 or 40.8% |
| Sodium nitrate (SN) | 5.5 or 6.06% |
| Water | 5.5 or 6.06% |
| Ethylene glycol | 10.0 or 11.03% |
| Guar gum—commercial | 0.2 or 0.22% |

The sodium nitrate was dissolved first in the water and then the calcium nitrate and ammonium nitrate were added together to the solution. Temperature of this mixture was about 70° C. Water of crystallization released from the calcium nitrate helped maintain liquidity. This total mixture had a pH of about 4.5 and an oxygen balance of about +11%.

The guar gum was dispersed in the ethylene glycol and the resulting dispersion added to the oxidizer mixture. The resulting composition was a solution having somewhat higher viscosity than an ordinary aqueous solution of the same salts. It was cooled down to about 50° C before adding particulate fuel or sensitizer ingredients in the form of various pre-mixes mentioned below. This solution had a "fudge" point (congelation temperature) of about 35° C.

In order to cross-link the gum to get higher viscosity and thus prevent segregation of suspended fuel particles, etc., a cross-linking agent or in some cases a combination of oxidizer-reducer agents was used. A typical agent, designated "A," was a 50/50 solution of potassium or sodium dichromate. Gallic acid or potassium antimony tartrate was used as reducing agent in a number of examples. In some of these, gassing agents such as nitrous acid or ammonium, sodium or potassium nitrite were added in very small proportions, sometimes with melamine or thiourea to accelerate aeration. Hydrogen peroxide was used in some cases, along with traces of potassium iodide or manganese dioxide to catalyze decomposition. In some cases it was difficult to thicken slurries with pH above 3.0. In these a small amount of nitric acid was used to lower the pH slightly. Thus 0.55 cc of 58% nitric acid per 100 g. of slurry brought pH down to 3.0 and 0.2 cc brought it to a level between 1.0 and 2.0. Thiourea speeded up the thickening and also increased the gassing rate when ammonium, potassium, or sodium nitrite were used. Gassing agents are useful not only to reduce density but also to increase sensitivity. Numerous gassing agents are available, as will readily be understood by those skilled in the art.

Slurries were made up using ground pitch or gilsonite alone, or finely divided aluminum alone as dry fuel. The gassing rate of such slurries, using $KNO_2$, did not change significantly with either fuel but initial thickening was somewhat better with aluminum. Gassing and reasons therefor are discussed further below. A self-cross-linking guar gum was a satisfactory thickener, as long as pH was not too high. So was potato starch. As little as 1% potato starch gave good initial thickening but for the increased gel stability needed for prolonged storage, 3% was used. With lesser quantities of potato starch, the gelled slurries seemed to break down after standing a few days. While potato starch is used in these examples, any of the strongly cross-linked polysaccharides, i.e. gums and starches, may be used.

Several examples were made up starting with the above solution $S_1$, using about 0.16 cc of concentrated (58% or 70%) nitric acid per 100 grams to reduce pH and 0.2% of $KNO_2$ as a gassing agent. Potato starch (PS) was used as thickener. In some cases extra ethylene glycol (EG) was added.

TABLE II

| Ex. | % Solution | Added Thickener | Fuels | Modifiers |
|---|---|---|---|---|
| E | 94 | 3% PS | 3% ground pitch | 0.05% thiourea<br>0.06% $KNO_3$<br>0.3 cc. "A" |
| F | 87.2 | 3% PS | 3% ground pitch<br>6% EG | 0.2% thiourea<br>0.12% $KNO_3$<br>0.3 cc "A" |
| G | 80.2 | 3% PS | 10% fine atomized aluminum<br>6% EG | 0.05% thiourea<br>0.12% $KNO_3$<br>0.3 cc "A" |

Composition E had a density of 1.14 g/cc. and was fired successfully in 3-inch, 2 ½-inch and 2-inch diameter columns at 0° C, using a standard booster. A similar composition having higher density 1.22, failed in a 2-inch column at the same temperature. Example F, with a density of 1.19 fired successfully under similar conditions as did Example G with a density of 1.06. Critical density for a 2 ½-inch column appears to be about 1.20. Hence, where a column of slurry explosive is tall, and where its own hydrostatic head, plus stemming, compresses it supplemental aeration or gassing may be needed. The sensitivity at 0° C is considered quite remarkable for a slurry explosive containing no self-explosive and no paint grade aluminum powder.

The compositions of Examples E, F and G were treated with 0.2, 0.1 and 0.3 cc, respectively (per 100 grams) of concentrated (58%) nitric acid to reduce the pH to where thickening could be accomplished successfully with potato starch. Additional experiments were made to obtain a thickening system that would be effective without reducing the pH by use of acid.

Using solution $S_1$, as above, and cross-linking the thickener by an oxidation-reduction combination of agents, i.e. 0.2 to 0.3% agent "A" ($K_2Cr_2O_7$ in water) and gallic acid (GA) in proportions of 0.02 to 0.5, good thickening was realized in slurries of high pH (4.3 to 5.0). In some of these aluminum was used as a fuel, to supplement the ethylene glycol in the solution. In others a guar meal was the fuel and in still others a combination of aluminum and guar meal (GM) was used. Significant data are given in Table III. Each of these contained 3% by weight of potato starch as a thickener. Penetration of the slurry as an indication of its viscosity was measured by use of a specially designed cone-shaped penetrometer. These readings were taken after 5 minutes and after 10 minutes, shown in this order; likewise, densities are given after 5 minutes, 30 minutes and 24 hrs. to show effectiveness of gassing.

TABLE III

| Ex. | % $S_1$ | Fuel % | X-link Agents | pH | % $KNO_3$ | Pen. | Density g./cc. |
|---|---|---|---|---|---|---|---|
| H | 87.5 | 8.5 Al | 0.05 GA | 4.6 | 0.4 | 250<br>180 | 1.14<br>1.02<br>0.78 |
| J | 86.9 | 8.5 Al | 0.05 GA | — | 1.0 | 170<br>— | 0.89<br>0.75<br>0.43 |
| K | 89.8 | 9.6 GM | 0.05 GA | 4.8 | 0.4 | 240<br>180 | 0.82<br>0.73<br>0.57 |
| L | 88.4 | 5.0 Al<br>6.0 GM | 0.05 GA | 5.0 | 0.4 | 250<br>180 | 0.87<br>0.75<br>0.60 |
| M | 87.9 | 8.5 Al<br>3.0 GM | 0.05 GA | 4.8 | 0.4 | 230<br>180 | 0.90<br>0.77<br>0.60 |
| N | 86.15 | 10 Al | 0.5 GA | — | 0.6 | —<br>300 | 0.82<br>—<br>0.69 |

Blasting slurries must be at least reasonably stable in composition, consistency and density, particularly when they are packaged or are to be used in boreholes where they may stand 24 hours or more before use. If the gel breaks down (or viscosity decreases) so as to permit segregation of the suspended fuel and sensitizer particles (called "pre-mix") the composition may become worthless. If it loses its aeration or entrapped gas it may become so insensitive that it will not detonate. Likewise, if placed in deep boreholes, the lower part of the explosive column may be under sufficient hydrostatic or superimposed pressure that the charge will not detonate, or at least will not detonate all the way. A particular object, realized in this invention, was to obtain stable gassed slurries that can be detonated in 2 ½-inch columns or larger, at temperatures as low as 5° C and under pressures of up to 50 psi. The products described in Table III above meet these requirements. Many, perhaps most, of the blasting slurries of the prior art fall far short of the latter requirement.

The use of ethylene glycol with its fuel value and its low-temperature solvent properties, as a significant ingredient is one important feature. Another is the use of calcium nitrate which makes it possible to use higher total proportions of oxidizer for a given fudge point. A mixture of oxidizers containing ammonium nitrate and sodium nitrate also is usually preferred. As noted above, a fudge point as low as 35° C is quite remarkable and some of these products have such. The use of an effective cross-linking system such as dichromate-gallic acid or other oxidation-reduction combinations, which are reasonably independent of pH is important. While acid can be added to slurries to reduce their pH and improve the thickening or gelling effect of starches and gums, this is often quite undesirable. Slurries of low pH *(high acidity) are excessively corrosive to mixing and pumping equipment. Hence, a thickening system not dependent on low pH is advantageous. In situ mixing and pumping of blasting agents has many advantages. Separate ingredients which are non-explosive individually can be combined at the mine and pumped directly to the borehole before they get too viscous for pumping through hoses. Thus controlled viscosity, which builds up slowly enough to permit mixing and pumping but rapidly enough to prevent segregation of solids or borehole water intrusion in the gel, is important. Compositions of this invention have all these desirable properties, including density control when the slurry is under the pressure of a tall column in a borehole. They may include various combinations of inorganic oxidizer salts such as nitrates, chlorates and perchlorates.

Preferably, the slurries of this invention include at least 5% by weight of ethylene glycol as a fuel and liquid extender, at least 10% of calcium nitrate, a stable thickening system, and enough gassing agent to keep the slurry at density not exceeding 1.20 g/cc under 50 psi pressure. Particularly preferred are slurries containing at least 8% of ethylene glycol, at least 20% of calcium nitrate, and less than 8% added water propylene glycol can be used in lieu of part or all of the ethylene glycol; see Table I above.

Variations in ingredients and proportions, including use of self-explosive particles in some cases and other types and varieties of fuels and other ingredients can be made within the scope of this invention as will be obvious to those skilled in the art.

What is claimed is:

1. A pumpable and pourable aqueous slurry blasting ɔmposition of low water content and high sensitivity, ɔmprising a liquid phase which includes a solution of ɔwerful oxidizer salts selected from the group which ɔnsists of inorganic nitrates, chlorates and perchlo-ıtes and including at least 10% by weight, based on the ɔtal composition, of calcium nitrate, said liquid com-rising water and ethylene glycol and including a vis-ɔsity-increasing agent in the liquid phase per se to npart thereto a viscosity sufficient to entrap and hold ny bubbles of gas dispersed in said phase, a sufficient uantity of gas in the form of tiny bubbles being dis-ersed throughout said liquid phase to substantially nhance the sensitivity of the whole composition to etonation, and a storage stable, strongly cross-linked nickener or gel former selected from the group which onsists of polysaccharide gums and starches in propor-ons sufficient to permanently hold said gas bubbles ispersed in situ and also to inhibit segregation of solid articles suspended in the liquid phase and inhibit in-usion of borehole water into said composition.

2. Composition according to claim 1 which contains t least 8% of ethylene glycol and wherein the thick-ner is cross-linked by a combination oxidation-eduction cross-linking system.

3. Composition according to claim 1 wherein the lurry contains sufficient gassing agent to hold its den-ity below 1.2 grams per cubic centimeter under a ɔressure of 50 psi.

4. Composition according to claim 1 in which there is t least 20% by weight, based on total composition, of alcium nitrate.

5. Composition according to claim 1 which includes t least 8% of ethylene glycol.

6. Composition according to claim 1 which includes ıt least 10% of calcium nitrate, at least 8% of ethylene glycol, and not more than 8% of water, not including water of crystallization associated with said calcium nitrate.

7. Composition according to claim 1 which includes at least 5% of ethylene glycol, at least 10% of calcium nitrate, an oxidation-reduction cross-linked gel former, and sufficient gassing agent to keep the slurry density below 1.2 g/cc. under a pressure of 50 psi.

8. Composition according to claim 7 which includes finely divided aluminum as a fuel.

9. Composition according to claim 7 which includes at least 8% of ethylene glycol, at least 20% of calcium nitrate, and which is sensitive to detonation in a 2-inch column at 10° C by a standard booster.

*10. A pumpable and pourable aqueous slurry blasting composition of low water content and high sensitivity, comprising a liquid phase which includes a solution of powerful oxidizer salts selected from the group which consists of inorganic nitrates, chlorates and perchlorates and including at least 10% by weight, based on the total composition, of calcium nitrate, said liquid comprising water and propylene glycol, and including a viscosity-increasing agent in the liquid phase per se to impart thereto a viscosity sufficient to entrap and hold tiny bubbles of gas dispersed in said phase, a sufficient quantity of gas in the form of tiny bubbles being dispersed throughout said liquid phase to substantially enhance the sensitivity of the whole composition to detonation, and a storage stable, strongly cross-linked thickener or gel former selected from the group which consists of polysaccharide gums and starches in proportions sufficient to permanently hold said gas bubbles dispersed in situ and also to inhibit segregation of solid particles suspended in the liquid phase and inhibit intrusion of borehole water into said composition.*

* * * * *